INVENTOR.
JOHN B. LORD
BY Bruce C. Lutz
ATTORNEY

INVENTOR.
JOHN B. LORD united States Patent Office 3,430,145
Patented Feb. 25, 1969

3,430,145
SEPARATION OF HARMONIC BANDS OF A SIGNAL BY INSERTING AMPLITUDE RELATED PULSES BETWEEN SAMPLING PULSES
John B. Lord, Edmonds, Wash., assignor to Honeywell Inc., Minneapolis, Minn., a corporation of Delaware
Filed Apr. 16, 1965, Ser. No. 448,618
U.S. Cl. 325—42                                    3 Claims
Int. Cl. H04b 1/66; H03k 5/08

ABSTRACT OF THE DISCLOSURE

Apparatus for inserting pulses between sampled data pulses to create separate aliases in the frequency spectrum of the data signal to simplify the filtering of the principal alias from the harmonic aliases and thus lower the band width necessary to transmit the sampled data signal.

---

This invention relates generally to a method of and apparatus for communicating data and is more particularly directed to an embodiment showing a method of and apparatus for transmission of pulse amplitude modulated (PAM) data in a minimum band width.

In communicating information of a pulse amplitude modulated nature in the past, maximum theoretical efficiencies have not been attained while maintaining a low signal-to-noise ratio. This lack of efficiency is due to "aliases" or harmonic frequency signals which inhibit the efficient transmission of pulse amplitude modulated signals. This background material will be discussed in more detail later in the specification but for the present it will suffice to state that the present invention eliminates or cancels the alias by inserting an intermediate pulse between each of the sampling pulses such that the alias or harmonic bands of signal in the frequency domain are separated far enough apart so that a band width filter will include only the primary signals and not include the frequency components in the alias bands which tend to reduce the accuracy of the transmitted signal by distorting the signal being transmitted.

It is therefore an object of my invention to provide improved sampled data signal processing apparatus.

A further object of my invention is to provide an improved method for processing sampled data signals.

These and other objects of my invention will become apparent from a consideration of the appended specification, claims, and drawing in which:

Figure 1:
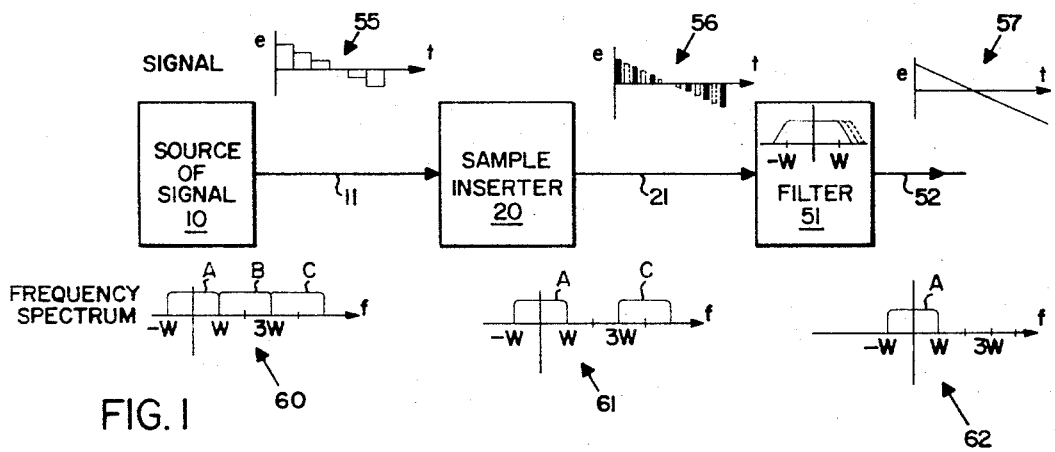
FIGURE 1 is a graphic and block diagrammatic sketch illustrating the method and a general form of apparatus embodying the principles of my invention.

Referring now to FIGURE 1 of the drawing there is shown a source of signal 10 connected to a sampler-inserter 20 through conductor 11 and a filter 51 connected to sampler-inserter through conductor 21. The output of the apparatus appears on conductor 52 connected to the output of filter 51.

Source of signal 10 may be comprised of a suitable means for generating a pulse amplitude modulated signal having the general wave form shown in curve 55 and the general frequency spectrum indicated on curve 60 as including a primary spectral component 60A and adjacent alias spectral components indicated by reference characters 60B and 60C.

In equally spaced data two frequencies are aliases of one another im corresponding frequencies cannot be distinguished by their equally spaced values. Thus, for use in this specification and the appended claims an alias is defined as and is intended to include a frequency band which covers the frequency spectrum of a signal. This band may cover either the primary signal or any of its harmonics.

Sampler-inserter or computer-interlacer 20 is comprised of suitable means for synchronously sampling the PAM signal and interlacing or inserting samples, the magnitudes of which are computed in relation to the signal as indicated by curve 55, intermediate each of the pulses obtained from sampling the signal indicated by curve 55. The inserted pulses are indicated on curve 56 as dashed lines and appear on conductor 21 in combination with the sampling pulses as a sampled data signal that has been effectively sampled at a frequency twice that of the PAM signal indicated on curve 55. The frequency spectrum of the signal appearing on conductor 21 at the output of sampler-inserter 20 is shown as comprised of a primary spectral component 61A and an alias spectral component 61C. The portion of the frequency spectrum that had been occupied by alias component 60B is of substantially zero amplitude and it may be noted that each alternate alias spectral component will be elimianted from the frequency spectrum of the sampled data signal.

Figure 3:
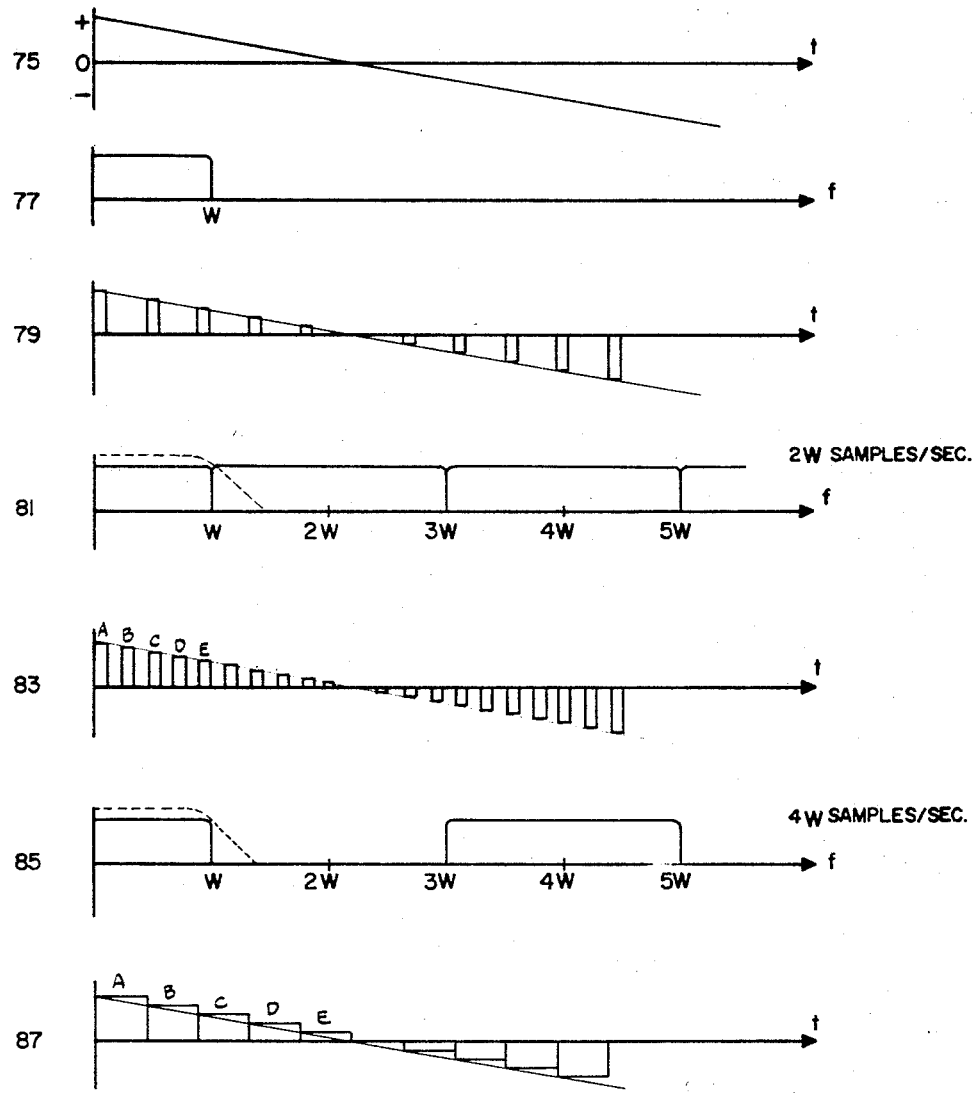
FIGURE 3 is a series of waveforms in both the time and frequency domain showing waveforms of various signals and their frequency spectrum components.

In order to provide a better understanding of the invention, a short discussion will be presented on the basic information related to samp!ing techniques. FIGURE 3 has 7 curves numbered from 75 to 87. Curve 75 is representative of a given analog function having a frequency domain such as shown in curve 77. It will be noticed that in the two curves the horizontal axes are plotted in time and frequency respectively. Curve 77 shows that the highest frequency which occurs in the signal 75 is of a frequency W. If the analog signal 75 is sampled at a frequency which is twice the frequency of the highest frequency component in this signal or in other words twice the frequency of W, a wave form somewhat similar to that shown in 79 will be obtained. Due to harmonics generated, etc., the frequency components contained in the signal presented by the sampling technique 79 will occupy a frequency domain such as shown in curve 81. In other words, the first harmonic which extends from W to 3W is immediately adjacent the frequency component of the fundamental signal which although shown from O to W actually extends down to —W. The second harmonic occurs from 3W to 5W. The curve 81 is not intended to illustrate the actual amplitude of these frequency components but merely to show the band wherein these components will occur. This frequency of sampling is called the Nyquist rate. It is known to those skilled in the art that if the sampling rate is twice the Nyquist rate, such as is shown in the sampling represented by curve 83, that the frequency spectrum of this sampling is such as in curve 85. In other words, there is a separation between W and 3W wherein substantially no frequency components occur. Another way of stating this is that the first harmonic now occurs between 3W and 5W. Referring back to curve 81 it will be noted that all the pertinent information is contained in the band of frequencies up to and including W. Since all the information necessary for transmittal of the signal being sampled is contained within this range, anything above this is extraneous. Therefore, if it is desired to send this information in a minimum band width, a filter must be used to filter out all the higher harmonics. Since perfect filters or filters which stop passing signals at a given frequency while passing the immediately lower frequency signals at full amplitude are very difficult, if not impossible, to make, present day filters will pass some of the harmonic signals.

This is illustrated diagrammatically by the dashed line in 81. In other words, some of the frequency components between W and the point at which the dashed line intersects with the horizontal axis will be included in the output after the pulses shown in curve 79 are transmitted through a filter having the general characteristics shown as the dashed lines in curve 81. If however the frequency used for sampling the analog signal is increased, there will be a separation between the fundamental and the first harmonic and if this signal is applied to a low pass filter or a band pass filter, these extreneous frequencies will not be included in the output. This is shown diagrammatically in curve 85 where the dashed lines represent a filter somewhat similar to that used in curve 81. In this case since there is no band of frequencies between W and the intersection of the dashed lines with the horizontal axis, only the fundamental frequency component of the curve 83 will be included. As is known to those skilled in the art the sampling frequency does not have to be twice the Nyquist rate in order to obtain a separation between the fundamental and the first harmonic. Any rate above the Nyquist rate will start to produce a separation. This separation increases as the sampling rate increases.

The above information suggests that the best thing to do is to sample a signal at twice the Nyquist rate and then everything will be simple to filter. However, in some instances such as has been encountered in connection with the present invention, the information presented is already of the form shown in curve 87. Curve 87 is a pulse amplitude modulated (PAM) signal indicative of the signal shown as curve 75. The frequency spectrum of curve 87 is substantially that shown in curve 81. A PAM signal may be found in any number of places and specifically could be obtained from a digital-to-analog converter. In order to transmit this information without including the extraneous frequencies which would be included by using a filter such as shown in curve 81, the present invention is utilized to sample each of the pulses such as 87A, 87B, 87C, and etc. These pulses or samples could be illustrated as pulses 83A, 83C, and 83E. The invention further calculates what the value of a pulse would be if it were midway between these sampling pulses. After determining what the amplitude of this pulse would be, it inserts these new pulses between the sampled pulses. The amplitude of these inserted pulses is dependent upon the previous train of pulses and the future train of pulses. In theory this information would have to be an integrated amount from minus infinity to plus infinity. In practice, it will be realized that such a condition cannot be obtained practically. However, the technique used in this invention to produce pulses such as 83B and 83D will be close enough to the value which would have been obtained if an analog signal had been sampled at twice the Nyquist rate in the first instance so that a substantially error free output will be obtained. The errors referred to above are defined as those errors which creep into the output due to distortions produced by interaction of the signals of any of the harmonics and especially the first harmonic combining with the fundamental frequency signals.

Figure 2:
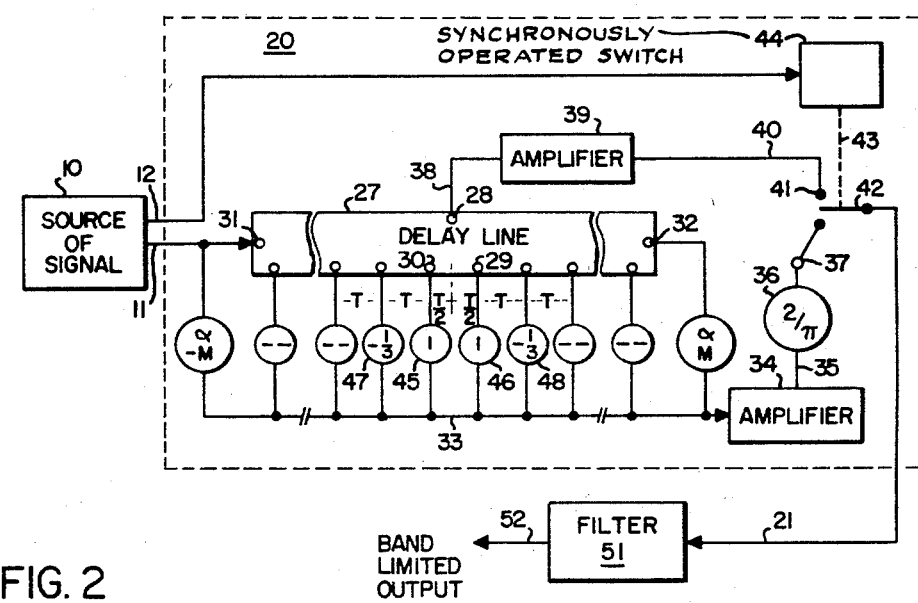
FIGURE 2 is a specific operative embodiment exemplifying one specific form of appaartus which may be operative to carry out the principles of my invention.

Filter 51 which is shown in FIGURES 1 and 2 may be any suitable low pass filter or band pass filter having an upper frequency characteristic somewhat similar to that shown in dashed lines in either curves 81 or 85. In other words, this filter has a substantially flat transmission characteristic below W and substantially zero transmission characteristic above 3W. The characteristics of the filter are shown in the block in FIGURE 1 which is labeled filter 51. Curves 57 and 62 represent the wave form of the output signal and the frequency spectrum thereof, appearing on conductor 52 connected to the output of filter 51. As will be noted these are similar to the curves 75 and 77 used in providing a brief explanation of the fundamentals involved in this invention. In other words, curve 57 represents the analog equivalent of the data signal that may have been originally sampled at some point or which was intended to be presented by the digital-to-analog converter. Since all the alias components or harmonics have been eliminated by the filter 51, only the primary spectral component remains to be shown on curve 62.

In summary, it may thus be seen that a data signal may be sampled at a frequency substantially equal to twice the highest frequency component of the data signal, a plurality of pulses having magnitudes related to the sampled data signal inserted intermediate each of the sampled data signal pulses and the resultant sampled data signal containing the inserted, or interlaced, pulses subsequently transferred through a conventional low-pass filter to provide a continuous analog signal having minimum band width and a minimum of distortion.

In the illustrative operative apparatus embodying the principles of my invention shown in FIGURE 2, sampler-inserter 20 is comprised of a delay line 27 having end terminals 31 and 32, a terminal 28 disposed at the center thereof and a plurality of taps disposed symmetrically of tap 28 beginning with taps 29 and 30 spaced $\tau/2$ seconds from terminal 28 and a plurality of taps spaced $\tau$ seconds apart. With the exception of center tap terminal 28, all of the terminals 31 . . . 30 29 . . . 32 are connected through a plurality of attenuators, $\alpha_{-m}$ . . . 47, 45, 46, 48 . . . $\alpha_m$ to a summing conductor 33 that is in turn connected to an amplifier 34. The attenuators are assigned values that are symmetrical with respect to center tap 28 whereby attenuators 45 and 46 are indicated as having an attenuation characteristic of 1, attenuators 47 and 48 are provided to have an attenuation characteristic of $-\frac{1}{3}$ and subsequent pairs of symmetrically disposed attenuators may proceed with the series to provide values of $\frac{1}{5}$, $-\frac{1}{7}$ . . . etc. Input terminal 31 is shown connected to conductor 11 which provides a sampled data signal at a rate of $1/\tau$ pulses per second. Conductor 12, upon which a synchronizing signal related to the frequency of the sampled data signal on conductor 11, is connected to a suitable driving means 44 which is mechanically connected to a moveable contact 42 to be synchronously driven, with respect to the sampled data signal, at a rate of $1/\tau$ cycles per second to alternately connect stationary contacts 37 and 41 to output conductor 21 at a frequency, $2/\tau$, or twice the frequency of the sampled data signal. Stationary contact 37 is connected to amplifier 34 through an attenuator 36 and conductor 35. Stationary contact 41 is connected to center tap terminal 28 on delay line 27 through conductor 40, amplifier 39, and conductor 38. Attenuator 36 is shown as providing an attenuation factor of $2/\pi$. Conductor 21 is connected to filter 51 and a filtered output appears on conductor 52.

In operation, the apparatus shown in FIGURE 2 provides a signal at stationary contact 41 related to the data sampled pulse present at center tap terminal 28 in delay line 27 and simultaneously a signal, related to the preceding and succeeding pulses in delay line 27 of the sampled data signal, appears on stationary contact 37. Moveable contact 42 is synchronously and alternately connected to stationary contacts 37 and 41 to provide a successive train of pulses at twice the frequency of the sampled data signal appearing on conductor 11. The particular synchronizing arrangement is representative of a number of means for alternately sampling the sampled data signal and the computed signals to be inserted, and it is anticipated that those skilled in the art, upon becoming familiar with the principles of my invention, will readily perceive that other forms of sampling apparatus may be utilized to provide similar operational characteristics.

It is to be understood that other modifications and embodiments of my invention will become apparent to those skilled in the art upon becoming familiar with the principles of my invention as described in the several embodiments illustrating the method and apparatus of my invention that the scope of my invention is to be governed solely by the appended claims.

I claim:
1. In combination with a sampled data signal of the class above described wherein the sampling rate of a signal to be processed is substantially equal to twice the highest frequency in the signal to be processed, apparatus for eliminating alternate aliases in the frequency spectrum of said sampled data signal, comprising in combination:

means, responsive to a sampled data signal of serial pulses, generating a further signal comprised of a plurality of successive serial pulses, each of said pulses having a value related to preceding and succeeding portions of said sampled data signal; and means for combining said sampled data signal and said further signal, wherein the means generating the further signal comprises a delay line including a plurality of terminals and a center tap terminal and a further terminal is connected to said plurality of terminals and the means for combining the sampled data signal and the further signal is operative to alternately connect said center tap terminal and said further terminal to an output terminal and wherein a plurality of attenuating means are connected intermediate the plurality of terminals on the delay line and the further terminal.

2. Apparatus for reducing the bandwidth of a sampled data signal having a frequency spectrum containing adjoining aliases comprising, in combination:

signal means for supplying a serial pulse signal having characteristics wherein the frequency spectrum band of the first harmonic is immediately adjacent the frequency spectrum band of the primary signal;

delay line means including an input connected to receive a signal from said signal means, a center tap output and a plurality of further outputs;

summing means connected to said plurality of further outputs and providing an output signal indicative of a weighted average of past and further pulses with respect to the pulses appearing at said center tap output;

switching means for operation synchronous with said signal means and connected to said center tap output and to said summing means for supplying an output signal alternately indicative of that received from said center tap and said summing means and having a frequency spectrum comprising separated aliases; and filter means connected to said switching means for receiving the output signal therefrom and providing as an apparatus output signal one which contains only the primary alias frequency components.

3. Apparatus as claimed in claim 2 wherein said signal means also supplies signals to said summing means and to said switching means, the output signal from said switching means containing alternate pulses indicative of the pulses received from said signal means and intermediate additional pulses created by the combination of said delay line, said summing means and said switching means.

References Cited

UNITED STATES PATENTS 3,366,739  1/1968  Parkinson _____ 179—15.55

ROBERT L. GRIFFIN, *Primary Examiner.*

W. S. FROMMER, *Assistant Examiner.*

U.S. Cl. X.R.

178—6; 179—15.55; 328—53